SIGNAL TRANSMISSION SYSTEM

Filed Oct. 6, 1954 3 Sheets-Sheet 1

INVENTOR
GEORGES ALBERT BOUTRY
LOUIS LE BLAN
BY Fred M Vogel
AGENT

Oct. 6, 1959 G. A. BOUTRY ET AL 2,907,830

SIGNAL TRANSMISSION SYSTEM

Filed Oct. 6, 1954 3 Sheets-Sheet 2

INVENTOR
GEORGES ALBERT BOUTRY
LOUIS LE BLAN
BY [signature]
AGENT

INVENTOR
GEORGES ALBERT BOUTRY
LOUIS LE BLAN
BY
AGENT

United States Patent Office 2,907,830

Patented Oct. 6, 1959

2,907,830

SIGNAL TRANSMISSION SYSTEM

Georges Albert Boutry, Villecresne, and Louis Le Blan, Paris, France, assignors, by mesne assignments, to North American Philips Company, Inc., New York, N.Y., a corporation of Delaware Application October 6, 1954, Serial No. 460,750

Claims priority, application France October 19, 1953

5 Claims. (Cl. 179—15)

Figure 1:
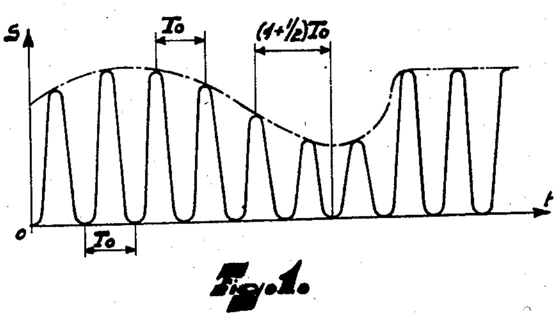

The present invention relates to a transmission system for electric signals, by which simultaneously two different relatively independent signals can be transmitted, each of which is independently variable as a function of time, by means of a single carrier wave which can be propagated radiographically.

Numerous systems have been suggested to this end, of which some are denoted by multiplex systems; if for example the various signals to be transmitted are contained within a single frequency band, the width of the total band required for the transmission of the various signals is multiplied by the number of the channels (or the number of the signals) to be transmitted, so that these systems are not suitable for the transmission of signals requiring a very wide frequency band, as is in general the case with signals for image transmission used in television. In the particular case in which the number of the signals to be transmitted simultaneously is not higher than two, it has been suggested to use two independent modulations of a single carrier wave, one of the signals modulating the positive half-cycle periods and the other the negative half-cycle periods of this carrier; but, owing to the independency of the two modulations, continuous components are introduced into the carrier, so that this transmission, which is possible via cables, becomes impossible by radio. However, it has also been suggested to use systems as described above, in which the carrier modulated in two different ways, i.e. the positive half periods and the negative half periods, is not transmitted directly, but modulates in turn, in this case in the conventional manner, the two half-cycle periods of a further carrier of higher frequency. In the latter system, if radiographical transmission can be ensured in the absence of special, indispensable means, hitherto unknown and forming exactly the object of the present invention, it has not been possible to separate at the receiver end the two transmitted signals into their initial state; i.e. it has not been possible to obtain one of the signals without being interfered with by a component associated with the other signal. This refers to the phenomenon analogous to the well-known phenomenon in telephone transmission, denoted by cross-talk.

The present invention has for its object to provide a system for simultaneous or non-simultaneous transmission by means of one carrier of suitably chosen frequency, of which the positive half-cycle periods are modulated not by the first signal but by a function of this signal and of the ratio between the instantaneous values of the two signals, and of which the negative half-cycle periods are modulated not by the second signal, but by a function of this signal and of the ratio between the two instantaneous values of the two signals, the carrier thus modulated modulating in turn, in conventional manner, a carrier of higher frequency, transmitted by radio.

According to the invention the function of the ratio between the two signals added to each signal to obtain a modulation signal is the equivalent, with the opposite polarity, of the cross-talk which in the absence of the correction interferes with the said signal at the receiver end. The invention thus provides transmission and receiving means for the two simultaneous signals, the conditions being such that the two signals can be reproduced, at least approximately (whatever the desired approximation may be) in their initial state at the receiver end.

If $f_1(t)$ and $f_2(t)$ designate the two signals to be transmitted simultaneously and if each of the signals is supposed to contain components within the frequency band determined by the interval $(0,\omega_0/2\pi)$ ($\omega_0$ designating the pulsation), it is known that it is possible to ensure their transmission for example by means of the following method: $f_1(t)$ is multiplied by $$g_1(t)=1-2\cos.\omega_0 t$$

and $f_2(t)$ by $$g_2(t)=1-2\cos.\omega_0 t$$

from which the components having frequencies within the band $(0,\omega_0/2\pi)$ are derived by means of a low-pass filter. The first product constitutes a signal $s_1$, the second product constitutes a second signal $s_2$ and the transmission method referred to above consists in using at the transmitter end the signal $S=s_1+s_2$.

The reception is ensured by the conventional multiplex method, which requires, in general, the generation of the multiplying functions $g_1$ and $g_2$ in the receiver with a given phase. Such a condition gives rise to important difficulties. The present invention uses a transmission method differing from the above and avoiding at the receiver end the production of the aforesaid functions. This method, which is known per se is based on the property of signals such as $s_1$ or $s_2$ to be referred to hereinafter.

It is supposed that the first signal $f_1(t)$ is a function of time which is always positive, the components of which are always within the band $(0, \omega_0/2\pi)$. Subsequent to multiplication by the function $g_1(t)$, the signal $s_1$ obtained by limiting the product to the band $(0, \omega_0/2\pi)$ may be represented by the full curve in Fig. 1, with which for the sake of simplicity it is assumed that $f_1$ varies only in the interval (0–1) (which comes down to considering the relative value of $f(t)$ with respect to its maximum value).

This curve has a sinusoidal course and the envelope of its maxima, drawn in dots in Fig. 1, is the initial signal $f_1(t)$.

It is known that if $f(t)$ is reduced to a constant value between two successive maxima of the full curve, a minimum zero is found, but a calculation shows that this property is realized with sufficient approximation, if $f(t)$ varies as a function of time; at any rate for $t=kT_0$ there is always obtained $s_1=f_1(t)$, which means that the maximum amplitudes of the full curve are always equal to the instantaneous values corresponding to the initial signal $f_1$, whereas for $t=(k+\frac{1}{2})T_0$ there is always obtained $s_1=0$, which means that the function $s_1$ is always zero for time values exactly between those corresponding to two consecutive maxima. In the same manner for the initial signal $f_2(t)$ there is obtained a resultant signal $s_2$, which also has a sinusoidal variation, the maxima of which lie at the times corresponding to the zero values of the preceding signals $s_1$, the values being the ordinates corresponding to those of the initial signal $f_2(t)$. The complex signal $s_1$ and $s_2$ represents the course shown in Fig. 2 and the signal $S^1=s_1+s_2$ corresponds to the sum of the ordinates of the two curves of this figure.

The transmission method according to the present invention consists finally in modulating only the positive half periods by the signal $f_1(t)$ and only the negative half periods by the signal $f_2(t)$. Thus the signal $s_2$, referred to above, must change its polarity. The two signals $s_1$ and $s_2$ according to the invention are thus represented in Figs. 3 and 4 (the difference between these two figures will be explained hereinafter). In the resultant signal $S=s_1+s_2$ the positive peaks corespond to equidistant ordinates (spaced by $T_0$, indicated in Fig. 1) of the initial signal $f_1(t)$, whereas the negative peaks correspond also to equidistant ordinates (interval $T_0$) of the initial signal $f_2(t)$. It is known that such signals ($f_1$ and $f_2$) can be separated at the receiver end by conventional demodulation methods used in two-channel multiplex systems, but as stated above, this method requires at the receiver end the production of electric signals corresponding to the multiplication factors $g_1(t)$ and $g_2(t)$, referred to above. If, use being made of the difference in polarity of the half periods modulated by $f_1$ and $f_2$, it is sufficient for example to separate them by means of circuits of unidirectional conductivity, for example diodes, a satisfying separation of each signal is obtained at the instants when the other signal is zero, but at the instants when the two signals are simultaneously different from zero, each of them will be interfed by the presence of the other. The result of the separation will finally not be the desired signal, but will be this signal varied by a component associated with the other signal.

Theoretical investigations have shown that the relative value of the component varying each of the signals thus separated could, in certain cases, attain 35 to 40% of the value of the desired signal. It is evident that such a variation of the incoming signals is inadmissible.

One of the objects of the present invention is to provide means capable of suppressing this variation and more particularly of neutralizing it by compensation.

Without limiting in any way the scope of the compensation method to be described hereinafter, it is always possible to represent by $$f_1(t)+F_1(t)$$

the signal really obtained in the general case instead of $f_1(t)$ (only the latter is wanted) at the receiver end, in the absence of correction and by $$f_2(t)+F_2(t)$$

the signal obtained under the same conditions instead of $f_2(t)$.

A similar unwanted received signal is known in telephone technique under the name of cross-talk. Although this denomination may sometimes be unsuitable, if we are concerned with more general signals, it will be adopted in the following description.

The additional and unwanted term $F_1(t)$ designates the component introduced into $f_1(t)$ owing to the presence of the signal $f_2(t)$, which is not zero at the instant $t$. Similarly, the additional and unwanted term $F_2(t)$ designates the component introduced into the signal $f_2(t)$, owing to the presence of the signal $f_1(t)$, which is not zero at the instant $t$.

In practice it is easier to write:

$$f_1(t)+F_1(t)=f_1(t)(1+D_1(f_2/f_1))$$

$$f_2(t)+F_2(t)=f_2(t)(1+D_2(f_1/f_2))$$

The aforesaid relations, define the functions $D_1$ of $f_2/f_1$ for $f_1$ and $D_2$ of $f_1/f_2$ for $f_2$ as "coefficient of cross-talk."

The foregoing may be resumed in that, if the initial signals to be transmitted are $f_1$ and $f_2$ at the transmitter end, the receiving method in the general case, in the absence of any correction, requires in the first channel instead of signal $f_1$ the real signal $$f_1(1+D_1(f_2/f_1))$$

and in a second channel instead of $f_2$ the real signal:

$$f_2(1+D_2(f_1/f_2))$$

But, owing to the symmetry of the cross-talk relative to $f_1$ and $f_2$, it is permitted to state that the functions $D_1$ and $D_2$ are equal, so that only one of them, designated hereinafter by D without index, will be considered.

Thus we may write for the really obtained signals at the receiver end under the aforesaid conditions $$f_1(1+D(f_2/f_1)$$

and $$f_2(1+D(f_1/f_2)$$

According to an essential aspect of the invention the transmitter device comprises a checking detector, which supplies the aforesaid signals. By means of any known suitable device the difference from the initial signals yields the interfering terms or the cross-talk factor; then these factors are subtracted from the said initial signals, also by any known device, and only the signals resulting from this subtraction are transmitted.

In other words, instead of transmitting by periodical sampling directly the signals $f_1$ and $f_2$ by means of the functions $g_1(t)$ (for $f_1$) and $g_2(t)$ (for $f_2$), referred to above, or by any other known means, the complex signals:

$$f_1(1-D(f_2/f_1)$$

and $$f_2(1-D(f_1/f_2)$$

are transmitted.

Under these conditions at the receiver end the real signals are received:

$$f_1(1-D(f_2/f_1))\Big\{\Big(1+D\left[\frac{f_2(1-D(f_1/f_2))}{f_1(1-D(f_2/f_1))}\right]$$

and $$f_2(1-D(f_1/f_2))\Big\{\Big(1+D\frac{f_1(1-D(f_2/f_1))}{f_2(1-D(f_1/f_2))}\Big]$$

These signals are still disturbed by cross-talk, but to a materially lower proportion than if $f_1$ and $f_2$ were transmitted directly.

A second checking detector may, moreover, isolate the remaining cross-talk and permit of providing a second correction of the signals to be transmitted in the same manner as indicated above. If there is still some cross-talk, a third detector may also isolate it and permit to provide a third correction and so on. The invention utilizes thus the so-called successive repetition method, which is equivalent to the mathematical method of the successive approximations. This correction method according to the invention may, however, in certain cases prove to be complicated and not very practical.

According to a further aspect of the invention a single correction is carried out only once with the signals to be transmitted, the value of this correction being that provided by the first detector referred to above, multiplied, however, by a suitable coefficient K. It may be ascertained that by multiplying the cross-talk factor obtained by the difference between the initial signals and the corresponding signal supplied by the checking detector by a value equal to or substantially equal to 1.5, an approximate correction of the cross-talk is thus obtained, which is sufficient for practical use.

Thus, in the transmission system according to the invention, in order to ensure a sufficiently correct reception of the two independent signals $f_1(t)$ and $f_2(t)$, instead of these signals, $$f_1(1-KD(f_2/f_1)$$

and $$f_2(1-KD(f_1/f_2)$$

are transmitted by periodical sampling by means of the functions $g_1(t)$ and $g_2(t)$ or by any other known means. The value of the coefficient K is preferably but not necessarily substantially equal to 1.5.

It should be noted that the signals free from cross-talk, to be sampled by the signals corresponding to the functions $g_1(t)$ and $g_2(t)$ may be represented by curves having, in general, the same course as the initial signals $f_1(t)$ and $f_2(t)$. Consequently, Figs. 3 and 4, which show only simple diagrams by way of explanation, may represent indifferently either the initial signals or corrected signals.

Figure 3:
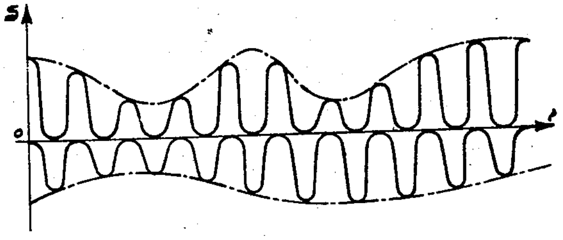
Figure 4:
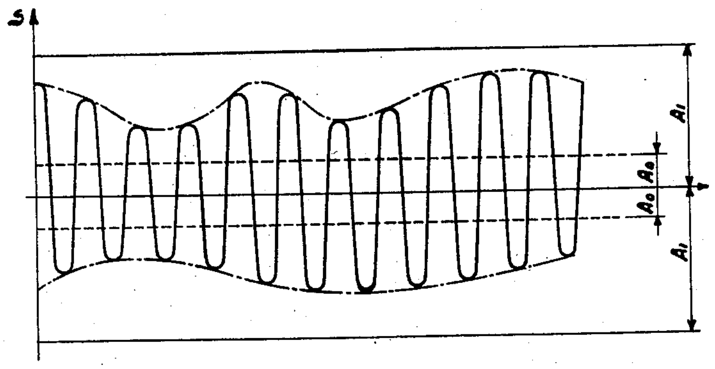

It being assumed that the representation is, indeed, that of the corrected signals, Fig. 3 shows the course signals intended for the conventional amplitude modulation of the carrier transmitted through the aerial, in case it is not necessary to add other kinds of signals, as for example if $f_1(t)$ and $f_2(t)$ represent different acoustical signals. Fig. 4, on the contrary, represents the course of the same modulation signals, if particular signals, which may be common to both the aforesaid signals must be added. This is for example the case with television. If $f_1(t)$ and $f_2(t)$ represent the signals associated with two different images, these signals must comprise other particular signals for synchronisation, blanking and so on.

The diagram shown in Fig. 4 may, for example, correspond to the case in which the video modulation is positive. It is known that under these conditions the black level does not necessarily correspond to the level corresponding to the zero value of the signals modulated by the initial signals to be transmitted or by combinations of the latter. The transformation of the signals shown in Fig. 3 into the signals shown in Fig. 4 may be carried out without difficulty, for example by means of fixed polarisation suitably introduced into the generators, amplifiers or mixers.

The invention may be used indifferently for the transmission of two different signals, either with negative modulation or with positive modulation. Changing over from one type of modulation to the other comes down to replacing $f_1(t)$ and $f_2(t)$ by $1-f_1(t)$ and $1-f_2(t)$, in order to change over from positive modulation, as described above, to negative modulation.

Finally, it will be noted that one of the two initial signals to be transmitted (for example $f_1(t)$) or even both of them may be constituted by a combination of elementary signals, for example $f_1(t)$ may be formed by two signals $f'_1(t)$ and $f''_1(t)$, the first of which lies in the frequency band $(0,\omega_1/2\pi)$ the second in the frequency band $(\omega_2/2\pi,\omega_0/2\pi)$ with $\omega_1 \leqslant \omega_2 \leqslant \omega_0$.

Figure 5:
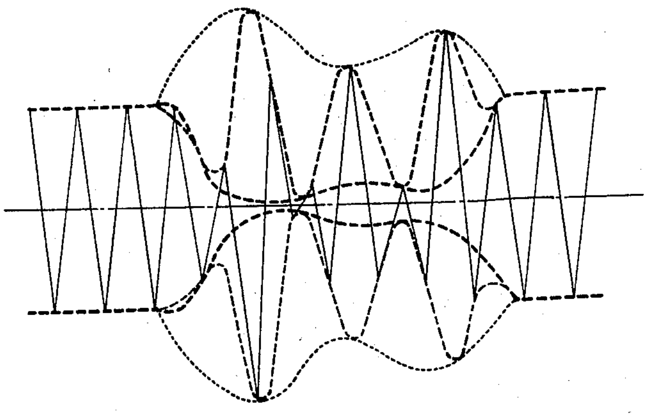

Fig. 5 shows the course of the final carrier wave, i.e. the carrier transmitted through the transmitter aerial, and modulated for example by means of the signals shown in Fig. 4. This carrier has, of course, a frequency higher than $\omega_0$.

This signal transmission system may, of course, be used without any limitation, if simultaneously or not simultaneously two initial signals, which may be relatively independent of not independent, are to be transmitted. It is particularly advantageous, if the said initial signals are constituted by components lying within a wide frequency band, for example for the image signals with television.

As will be set out hereinafter, the use of the invention in television technique permits the attainment of new, and very useful, results for the future development of television.

This is the case, for example, if the initial signal $f_1(t)$ is the video signal of a given transmission and the initial signal $f_2(t)$ is the video signal of a second transmission, which is independent of the former; then the invention provides the means to ensure the correct, simultaneous and independent transmission of two different, normally performed programmes on one carrier transmitted through an aerial, in one frequency band $(0,\omega_0/2\pi)$, which is common to the two transmissions.

If on the contrary the different monochromatic components of a colour television transmission are to be transmitted, the invention provides comparatively simple means to ensure the transmission of at least two of these components on one carrier in one frequency band. Recent researches have proved that it is possible to obtain colour images of a definition which is quite comparable with that of black-and-white images of a given standard by transmitting in the associated frequency band only two monochromatic components (preferably, but not necessarily green and red), whereas the third component (preferably but not necessarily blue) may be transmitted in a considerably smaller frequency band (reduced for example to 1/10 or even 1/20 of the former). As stated above, one of the initial signals, for example $f_1(t)$ may be a complex signal resulting for example from the joining of the transmitted frequencies for example within the band $(0,\omega_0/2\pi)$ or from the superimposition of the video signals on a monochromatic component requiring a wide frequency band and signals of the monochromatic component which requires a considerably smaller frequency band. In the latter case, after separation of the signals $f_1(t)$ and $f_2(t)$ at the receiver end the video signals associated with the two components transmitted in the signal $f_1(t)$ are separated in turn by means for example of suitable filters. This case is considered to be less interesting than that in which the system according to the invention is used to transmit only two monochromatic components requiring the same wide frequency band and/or the third component (within a smaller band) is transmitted independently by known means.

If the third monochromatic component is not transmitted independently, the video signals, designated by $f_1(t)$ and $f_2(t)$ may be supplied by two cameras, of which the optical axes are suitably spaced apart in a manner such that the video signal $f_1(t)$ correspond to what one eye of a spectator would see in front of the scene to be transmitted and that $f_2(t)$ correspond to what the other eye of the same spectator would see, the system according to the invention provides means to produce images giving the impression of relief.

In view of the extension and the importance of these applications in the television technique, these possibilities being, however, no limitation whatever for the present invention, the following description with reference to the accompanying figures (given by way of example only) will deal with various embodiments of the invention used in television, it being well understood that all features resulting from the text and from the figures form of course part of the said invention.

Figs. 1 to 5 show wave-forms of the signals described above.

Figure 6:
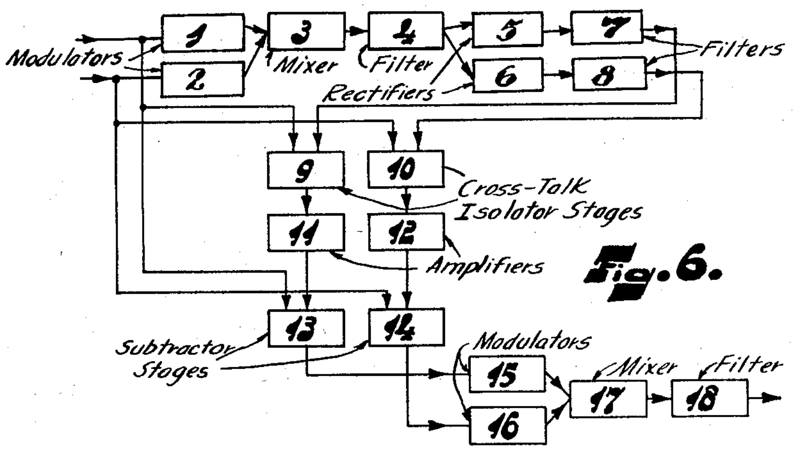

Fig. 6 shows diagrammatically a transmission method in which the signals effectively transmitted to the modulator of the carrier transmitted through the aerial are modified as described above, in order to render the cross-talk substantially inoperative at the receiver end. It shows the various stages of the correction of the initial signals and, by way of example, it shows the means to carry out this method.

Figure 7:
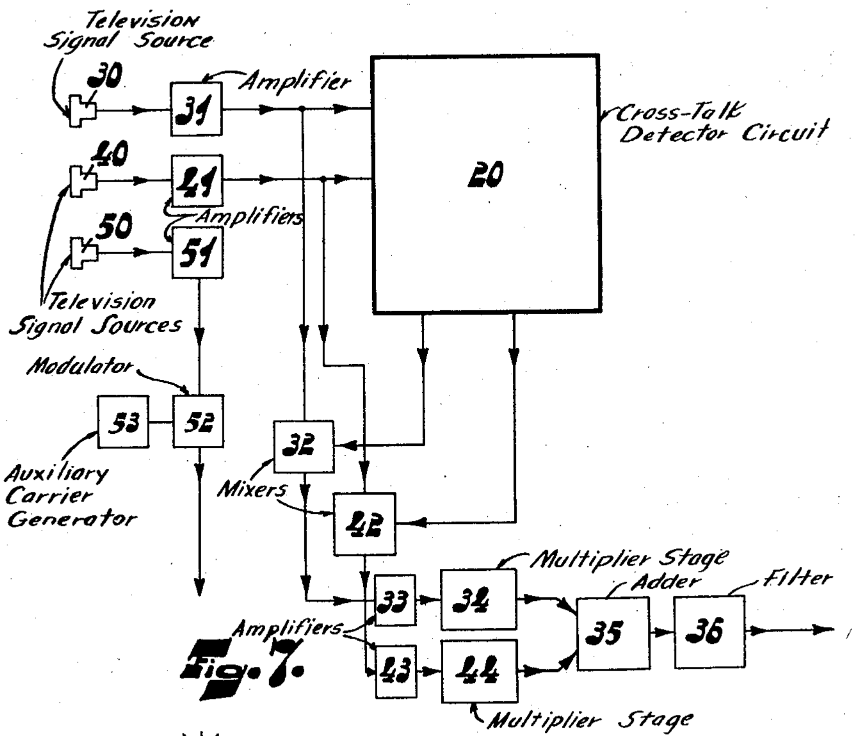

Fig. 7 shows diagrammatically a transmitter for television according to the invention, which may be used for the transmission:

(*a*)—of two different simultaneous programs intended to supply black-and-white images,
(*b*)—of one program intended to furnish relief images,
(*c*)—of two monochromatic components intended to produce colour images.

Figure 2:
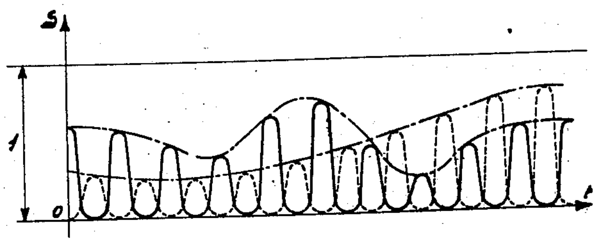

(As it is drawn Fig. 2 corresponds particularly to the case *c*.)

Figure 8:
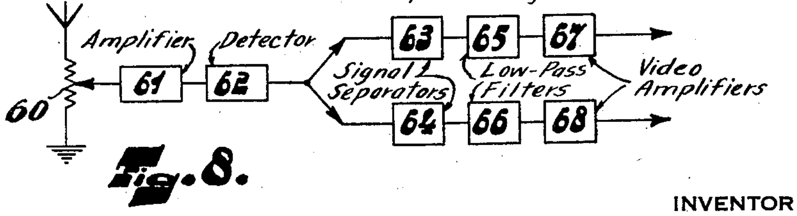

Finally Fig. 8 shows diagrammatically the parts of a colour television receiver permitting the reception of the two monochromatic components transmitted by a transmitter as shown in Fig. 7.

In all these figures elements similar in kind and in function are designated by the same references.

Moreover, all members used, such as generators, amplifiers, mixers, detectors and so on, being known per se will not be described in detail, the more so since the invention does not relate to these members, but to their arrangement and their association in function to a given purpose.

According to Fig. 6, which shows a correction method for the cross-talk according to the invention—the first initial electric signal to be transmatted, expressed as a function of time by the function $f_1(t)$, is applied to the input of a multiplying stage, where it is multiplied by an electric signal obtained by means of a generator (not shown) and expressed as a function of time by the function $g_1(t)=1+2\cos 2\omega_0 t$ wherein, as stated above, $\omega_0/2$ is the highest frequency of the components of $f_1(t)$ to be really transmitted.

The second initial electric signal to be transmitted expressed as a function of time by the function $f_2(t)$ is applied to the input of a second multiplying stage 2, where it is effectively multiplied by an electric signal obtained by means of a generator (not shown) and expressed as a function of time by the function $$g_2(t)=1-2\cos 2\omega_0 t$$

At the output of the multiplier 1 is thus obtained the signal $$s_1=f_1(t)g_1(t)$$

and at the output of the multiplier 2 the signal $$s_2=f_2(t)g_2(t)$$

In a mixing stage 3 the sum of the two signals $s_1$ and $s_2$ is formed after the polarity of the latter has been changed; at the output of this stage is thus obtained a signal $$S=s_1+(-s_2)=s_1-s_2$$

The signal S then traverses a filter 4, which limits the upper limit of the frequency band of this component to $2\omega_0/2\pi$.

This may, for example, be the signal shown in Fig. 3.

From the output of filter 4, the signal S is supplied to two parallel channels, one being connected to a stage 5, comprising a rectifier which only passes the positive half periods, the other to a stage 6, passing only the negative half periods. The stage 5 is followed by a filter 7, limiting the upper limit of the frequency band of the components of its own output signal to $\omega_0/2\pi$, and the stage 6 is followed by a similar filter 8, playing the same part for its own output signal.

As stated above, the signals obtained from the output of the filters 7 and 8 are, in general, not proportional to the corresponding input signals $f_1(t)$ and $f_2(t)$, but they contain a proportional component and a cross-talk component. Thus from filter 7 is derived a signal:

$$f'_1(t)=f_1(1+D(f_2/f_1))$$

instead of the signal $f_1(t)$ and from filter 8 a signal $$f'_2(t)=f_2(1+D(f_1/f_2))$$

instead of the signal $f_2(t)$.

In these expression D designates the cross-talk coefficient referred to above.

The cross-talk is isolated from the first signal in the stage 9, where the difference:

$$f'_1(t)-f_1(t)=f_1D(f_2/f_1)$$

is formed and that of the second signal in the stage 10, where in the same manner the difference:

$$f'_2(t)-f_2(t)=f_2D(f_1/f_2)$$

is formed.

As stated above, it is sufficient in practice to carry out a correction by compensation by means of the cross-talk components multiplied by a factor K. Consequently, the first difference from the stage 9 is applied to the input of an amplifier 11 and the second from the stage 10 is applied to the input of an amplifier 12, these two amplifiers, being suitably adjusted, permitting of deriving from their outputs the respective correction signals:

$$C_1=Kf_1D(f_2/f_1) \text{ and } C_2=Kf_2D(f_1/f_2)$$

These signals are substracted from the initial signals in the stages 13 and 14 respectively; from the output of stage 13 is thus obtained a signal:

$$\Phi_1(t)=f_1(t)-C_1=f_1(1-KD(f_2/f_1))$$

and from the output of stage 14 a signal:

$$\Phi_2(t)=f_2(t)-C_2=f_2(1-KD(f_1/f_2))$$

According to the invention these are the signals $\Phi_1(t)$ and $\Phi_2(t)$, which are transmitted instead of the initial signals $f_1(t)$ and $f_2(t)$, so that at the receiver end is obtained; the signal $\Phi_1(t)$ increased by its cross-talk and approximately equal (or proportional) to the signal $f_1(t)$, the signal $\Phi_2(t)$ increased by its cross-talk and approximately equal (or proportional) to the signal $f_2(t)$.

To this end the signal $\Phi_1(t)$ is multiplied by an electric signal obtained by means of a generator (not shown) and having the form:

$$\gamma_1(t)=1+2\cos\omega_0 t$$

in a stage 15, similar to stage 1 and the signal $\Phi_2(t)$ is multiplied by an electric signal, obtained by means of a generator (not shown) and having the form:

$$\gamma_2(t)=1-2\cos\omega_0 t$$

in a stage 16, similar to stage 2.

Thus we obtain the signals:

$$\sigma_1=\Phi_1(t)\gamma(t) \text{ and } \sigma_2=\Phi_2(t)\gamma_2(t)$$

of which the sum is formed, after having changed the polarity of the latter in the stage 17, similar to stage 3.

The resultant signal $$e=\sigma_1+(-\sigma_2)=\sigma_1-\sigma_2$$

obtained from the output of this stage and passing a filter 18, which limits the upper limit of the frequency of its component to $\omega_0/2\pi$.

The graph of the signal $\epsilon$ will be completely similar to that of Fig. 3.

(If it is supposed that this figure shows the signal S obtained from the output of filter 4, the effect of cross-talk becomes manifest by an increase in the ordinates of the successive positive and negative half periods of the curve having a sinusoidal course, but the course in general of the envelopes (shown in broken lines) is maintained.)

In the example of the cross-talk correction referred to above and shown diagrammatically in Fig. 6, it is assumed that all delay members, known per se, are, if necessary, arranged in a manner such that all signals applied through different channels to the same member or to the same comparison stage (for addition or subtraction) arrive in synchronism at these members or stages.

In general, it should be well understood that the invention provides mainly the correction of cross-talk by means of members capable of detecting and isolating all variations of the initial signals due to the receiving members or to any other member at any intermediate point of the transmission path, whatever the cause of these variations may be. Preferably, but not necessarily the said members intended to detect and isolate the cross-talk are identical with those provided in the receptor to detect the signals. Moreover, the coefficient K, by which the cross-talk signals must be multiplied in order to carry out the cross-talk correction, will be determined (for example by experiments) in accordance with the detection method applied or in accordance with the conditions and the amplifiers for example 11 and 12 will be adjusted accordingly.

For simplicity's sake, without any limitation, however, the correction device shown in Fig. 6 comprises certain members 1, 2, 3 and 4, which are identical with the transmitting members 15, 16, 17 and 18 respectively and certain members 5, 6, 7 and 8 which are identical with the members 63, 64, 65 and 66 respectively of the receiver, but by introducing other members into the circuit constituted by this device which may be identical with any other member in the transmitter circuit or in the normal circuit for the reception, the scope of the invention will not be exceeded.

In particular, referring to Fig. 6, the analogy of part of the correction circuit to the normal transmitter circuit may be increased by introducing for example into the correction circuit a modulation in a single band of a suitable wave in a manner such that the cross-talk signal comprises the variation which may result from the transmission on a single sideband. At the same time, the analogy of the other part of the correction circuit to the receiver circuit must be extended accordingly (by including for example the high-frequency amplifiers and the first detector).

In the description of Fig. 6 it is assumed that the stages 5 and 6 serve to supply separately the positive half periods and the negative half periods of the signal S, since the transmission system, shown by way of example, requires such a separation at the receiver end.

But it should be well understood that the invention is not confined to this receiving method and may be carried out whatever the detection method may be (it being understood, moreover, that the members comprised in the stages 5 and 6 are replaced by corresponding suitable members). In particular, the invention refers to the case in which the detection is a "peak detection."

If not any additional signal must be introduced into $\epsilon$, as is for example the case, if the initial signals $f_1(t)$ and $f_2(t)$ are acoustical signals, of which the separate, but simultaneous transmission is capable of providing for example stereophonic reproduction, this signal may serve, without any further modification of the conventional amplitude modulation of the carrier wave, transmitted through the aerial.

In the particular case of television, however, it is known that the black level remains in general over a zero level, which may for example be obtained by means of suitable adjustment of the multiplying members. Finally at the output of the filter 18 the sum $\epsilon$ is similar to that shown in Fig. 4. In the particular case of television with positive modulation the amplitude $A_1$, corresponds to the level of maximum brightness of the image points and the amplitudes $A_0$ correspond to the black level.

According to Fig. 7, the television transmitter in which the transmission system according to the invention is used, comprises two or three generator units of the video signals (cameras) according as: two similar black-and-white programs, two "optically spaced" images to obtain the impression of relief or two of the three monochromatic components to obtain colour images are to be transmitted. In the first case the production of each video signal may be carried out at various points. These generators, known per se and not forming part of the invention, need not be described and are designated by 30, 40 and 50. They are followed by corresponding amplifiers 31, 41 and 51 respectively. The generator 50, the amplifier 51 and the members following them are provided only in the case of colour images for the independent transmission of the third monochromatic component (preferably that of which the frequency band may be materially reduced without difficulty) and in any case by conventional methods not related to the invention.

In the following description will thus be considered: on the one hand the amplifier 31, supplying with a suitable level the video signal designated by the function $f_1(t)$, the synchronizing signals being already introduced or not introduced into this signal by known means, on the other hand the amplifier 41 playing the same part under the same conditions for the video signals designated by the function $f_2(t)$. The members known per se and consequently not shown for the production and the introduction of synchronizing signals may, for the two video signals $f_1$ and $f_2$, be common (in the case of colour or relief television) or different (in the case of the transmission of two black-and-white programs). From the outputs of the amplifiers 31 and 41 the said signals are applied on the one hand to a cross-talk detector device 20, for example that described with reference to Fig. 6 and on the other hand to the mixer stages 32 and 42, where they are subjected to the required correction to suppress the said cross-talk at the receiver end. The continuous components required to establish the black level are introduced into the stages 33 and 43 respectively, the multiplication of the signals from these stages by the electric signals designated by the functions $\gamma_1(t)$ and $\gamma_2(t)$, takes place in the stages 34 and 44, which supply the two output signals designated by $\sigma_1$ and $\sigma_2$ respectively, of which the sum $\epsilon$, subsequent to change of the polarity of the latter, is obtained in the stage 35, followed by the filter 36, limiting the upper limit of the frequency of the components of $\epsilon$ to be transmitted to $\omega_0/2\pi$.

From the filter 36 the signal $\epsilon$ is used to provide the conventional amplitude modultion of the wave transmitted through the aerial.

Of course, the amplifiers 31 and 41 are adjusted independently; for example, if the two components green and red of a transmission to reproduce colour images, their adjustment is such that each of these components exhibit at any instant a relative level which is proportional to its individual brightness, for example in the white standard with 2848° K. (which corresponds exactly to 59% for the green and to 37% for the red component).

In the case of colour television it is in general necessary to transmit also a third monochromatic component. To this end a generator 50 (camera) supplies a third video signal; this signal is amplified in the stage 51, then subsequent to passage, if necessary, through a filter limiting the upper value of its frequency band, it modulates in a stage 52 an auxiliary carrier wave supplied by the generator 53. This carrier is then transmitted either independently or mixed with the signal $\epsilon$, obtained from the output of filter 36, in order to modulate finally the carrier wave transmitted through the aerial and intended to ensure the transmission of the said signal $\epsilon$.

In the aforesaid transmission system the proceedings are approximately similar to those of a known pulse multiplex system with amplitude modulation and with two channels (one channel for each video signal), characterised, however, by the following properties:

(*a*)—on the one hand the sampling frequency is not equal to twice the upper limit of the frequency band which is common to the two video signals, but equal to this limit, (*b*)—on the other hand the sampling dots are transmitted with positive polarity for one signal and with negative polarity for the other.

From (*a*) it results that at a given instant the totality of the information is not transmitted. Thus for instance for a given television standard, corresponding by the conventional transmission methods to the formation of a complete image in two successive vertical scannings, the transmission system according to the invention requires four successive vertical scannings to form the same complete image. Hence the formation of the images requires a sequential method during the said scannings. On the contrary, the cross-talk correction as referred to above requires a permanent comparison in the stages 9 and 10 of Fig. 6 of the initial signals $f_1(t)$ and $f_2(t)$ with the altered signals $f_1(1+D(f_2/f_1))$ and $f_2(1+D(f_1/f_2))$ respectively.

According to one aspect of the invention this result is obtained by using for the selection of the cross-talk a higher sampling frequency than the sampling frequency required to ensure the final transmission of the signals. Thus the signals determined by the functions $g_1$ and $g_2$ provided to select the cross-talk comprise terms in cos $2\omega_0$, whereas the signals determined by the functions $\gamma_1$ and $\gamma_2$, used for the transmission proper comprises terms in cos $\omega_0 t$. The functions in cos $2\omega_0 t$ permit of obtaining as a first signal a signal equivalent to that of a two-channel multiplex system, transmitting in total the information in the band $(0,\omega_0/2\pi)$; these functions ensure thus the simultaneous transmission to the comparison stages 9 and 10 shown in Fig. 6. On the contrary the functions in cos $\omega_0 t$ ensure only a sequential transmission of the corresponding dots. It should be noted that the multiplying factors $g_1(t)$ and $g_2(t)$, introduced at the beginning, may be replaced by $$g_1(t)=1+r\cos\omega_0 t$$
$$g_2(t)=1-r\cos\omega_0 t$$

the invention being carried out without any further modification, although the accurate form of the auxiliary carrier of the signals varies in accordance with the value of $r$.

If $r=2$, as indicated above, the signal S obtained is that of a two-channel multiplex system with pulses modulated in amplitude and having opposite polarities for the two channels. If $$r=\frac{\pi}{2}=1.5708$$

the signal S is the same as when by means of $f_1$ and $f_2$ the modulation of the positive and negative half periods respectively of a real continuous wave of suitable amplitude, as a carrier wave is carried out separately, $r$ may also have other values and even have different values in the expressions $g_1(t)$ and $g_2(t)$.

It should be noted, moreover, that all characteristics of the present system are maintained if instead of using the method of transmission and cross-talk correction referred to above direct amplitude modulation by means of the signal $f_1(t)$, corrected from cross-talk is used for the positive half periods and direct amplitude modulation by the signal $f_2(t)$, corrected from cross-talk, is used for the negative half periods of an intermediate carrier having a frequency $\omega_0/2\pi$, produced by known methods. The cross-talk could be determined in the said manner, i.e. by comparison of the initial signals with signals obtained subsequent to detection of an auxiliary carrier having a frequency of $2\omega_0/2\pi$, thus modulated, whatever the detection method may be; it could then also be corrected in the same manner.

The separation of the signals in accordance with their relative polarities, on the contrary, provides a great simplification in the embodiment of the receivers. Owing to the cross-talk correction carried out in the transmitter, the receiver is capable, without the use of more or less complicated expedients, of supplying by this separation method correct signals which can immediately be used.

The receiver, shown diagrammatically in Fig. 8 permits the reception, the separation and the use of the signals transmitted by a transmitter as shown in Fig. 7.

According to Fig. 8 the carrier wave transmitted through the transmitter aerial, as indicated in Fig. 5, is received through the receiver aerial and the level of the "incoming carrier" is controlled by known means, for example the potentiometer 60. The incoming carrier is then amplified in a high-frequency amplifying stage 61, then it is subjected to a first detection in the stage 62.

This conventional detection may be carried out by known means and supplies the complex signal $\epsilon$ of the modulation of the carrier transmitted by the aerial, increased by the cross-talk, the signal S, shown for example in Figs. 3 or 4, thus being reproduced and comprising the two signals $\sigma_1$ and $\sigma_2$, increased by their respective cross-talk, the signals $s_1$ and $s_2$ thus being reproduced. The latter are then separated in accordance with their respective polarities in accordance with the transmission method given by way of example, in the stages 63 (for $s_1$) and 64 (for $s_1$), after which they are filtered by the low-pass filters 65 and 66 respectively and finally applied to the respective channels, known per se and comprising for example the video amplifiers 67 and 68.

It is obvious that numerous variants, known to those skilled in the art, referring to the construction of the known members and their various arrangements, also known per se, either in the correction circuit or in the transmission circuit proper or finally in the receiving circuit, may be used without falling out of the scope of the invention.

What is claimed is:

1. A transmission system for the transmission of two independent signals on a single carrier wave, comprising sources of said two signals, a source of said carrier wave, a transmitter having a modulator for modulating said carrier wave in accordance with said two signals to produce a transmitted signal, a receiver for receiving said transmited signal and including means for deriving said two signals from said carrier wave, said derived signals normally being subject to containing undesired cross-talk components, and circuit means connected in said transmitter to apply a cross-talk correction modulation component to said transmitted signal which, when received by said receiver, substantially compensates for said undesired cross-talk components, said circuit means comprising first means for modulating a first wave in accordance with said two signals to produce a modulated first wave, means for detecting said modulated first wave to derive therefrom said two signals and cross-talk components produced by the said modulation and detection of said first wave, means for combining said two independent signals each with a respective one of said derived two signals and the cross-talk components thereby to produce two resultant signals each including cross-talk components in negative phase to those produced in said modulation and detection of said first wave, and means for applying said resultant signals to said first mentioned modulator for modulating said carrier wave to produce the said transmitted signal.

2. A transmission system as claimed in claim 1, in which said two electric signals are television signals, and in which said transmitter includes a source of a sampling signal having a frequency at least as high as the highest frequency of said television signals, means connected to sample said television signals with said sampling signal, and a source of a second sampling signal having a frequency at least as high as twice the frequency of the first-mentioned sampling signal, and means connected to sample said cross-talk correction component with said second sampling signal.

3. A transmission system as claimed in claim 1, in which said two electric signals are television signals, and in which said transmitter includes a source of an auxiliary carrier, means for modulating the positive-polarity half-cycle periods of said auxiliary carrier with one of said television signals, means for modulating the negative-polarity half-cycle periods of said auxiliary carrier with the other of said television signals, the frequency of said auxiliary carrier being at least as high as the highest frequency of the transmitted signal, and a source of a second auxiliary carrier having a frequency at least twice as high as the frequency of the first-mentioned auxiliary carrier, and means connected to modulate said second auxiliary carrier with said cross-talk correction component.

4. A transmission system as claimed in claim 1, in which said transmitter includes a source of a sampling signal having a frequency at least as high as twice the highest frequency of said signals, means connected to sample said signals with said sampling signal, and a source of a second sampling signal having a frequency at least as high as twice the frequency of the first-mentioned sampling signal, and means connected to sample said cross-talk correction component with said second sampling signal.

5. A transmission system as claimed in claim 1, in which said transmitter includes a source of an auxiliary carrier, means for modulating the positive-polarity half-cycle periods of said auxiliary carrier with one of said signals, means for modulating the negative-polarity half-cycle periods of said auxiliary carrier with the other of said signals, the frequency of said auxiliary carrier being at least twice as high as the highest frequency of the transmitted signal, and a source of a second auxiliary carrier having a frequency at least twice as high as the frequency of the first-mentioned auxiliary carrier, and means connected to modulate said second auxiliary carrier with said cross-talk correction component.

References Cited in the file of this patent

UNITED STATES PATENTS

| | | |
|---|---|---|
| 2,352,634 | Hull | July 4, 1944 |
| 2,516,587 | Peterson | July 25, 1950 |
| 2,580,421 | Guanella | Jan. 1, 1952 |
| 2,681,384 | Guanella | June 15, 1954 |